United States Patent [19]

Lugli et al.

[11] 3,937,692

[45] Feb. 10, 1976

[54] PROCESS FOR THE STEREOSPECIFIC POLYMERIZATION OF DIOLEFINS, PRODUCTS OBTAINED THEREBY AND PROCESS FOR THE POLYMERIZATION OF OLEFINS

[75] Inventors: Gabriele Lugli; Alessandro Mazzei; Gabriele Modini, all of San Donato Milanese, Italy

[73] Assignee: Snamprogetti S.p.A., San Donato Milanese, Italy

[22] Filed: Nov. 17, 1972

[21] Appl. No.: 307,373

[30] Foreign Application Priority Data
Nov. 26, 1971  Italy .................................. 31730/71
Oct. 10, 1972  Italy .................................. 30289/72

[52] U.S. Cl. .......... 260/94.3; 260/79.5 C; 260/82.1; 260/85.3 R; 260/94.9 B; 260/94.9 C
[51] Int. Cl.². C08F 4/82; C08F 4/44; C08F 136/04
[58] Field of Search .......................... 260/94.3, 82.1

[56] References Cited
UNITED STATES PATENTS
3,379,706  4/1968  Wilke................................. 260/94.3
3,468,866  9/1969  Alferov et al...................... 260/94.3
3,719,653  3/1973  Dawans............................. 260/94.3

FOREIGN PATENTS OR APPLICATIONS
1,214,002  4/1966  Germany .......................... 260/94.3

Primary Examiner—Joseph L. Schofer
Assistant Examiner—A. Holler
Attorney, Agent, or Firm—Ralph M. Watson, Esq.

[57] ABSTRACT

A process for the stereospecific polymerization of olefins is described, wherein the selected monomer is homopolymerized, or the selected monomers are copolymerized, by reacting the selected monomer or monomers in the presence of a catalyst consisting of an uranium $\pi$ - allyl compound represented by one of the formulae:

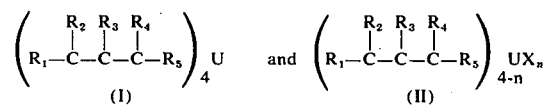

in which $R_1$, $R_2$, $R_3$, $R_4$ and $R_5$, the same or different, may be hydrogen atoms, alkyl radicals having from 1 to 10 carbon atoms, aryl radicals having from 6 to 10 carbon atoms, cycloalkyl radicals having from 4 to 10 carbon atoms, and alkylaryl radicals; the dotted line indicates the possible delocalization of the valence electrons; X is an anion selected from among $Cl^-$, $Br^-$ and $I^-$; and $n$ is an integer ranging from 1 to 3; and, optionally, a co-catalyst which is a Lewis acid, or a complex thereof with an ether, a tertiary amine or a phosphine.

20 Claims, No Drawings

PROCESS FOR THE STEREOSPECIFIC POLYMERIZATION OF DIOLEFINS, PRODUCTS OBTAINED THEREBY AND PROCESS FOR THE POLYMERIZATION OF OLEFINS

The present invention relates to a process for the stereospecific polymerization of diolefins, to the polymer products obtained thereby and to a process for the polymerization of olefins.

Uranium $\pi$-allyl compounds are known from the italian patent application n. 16315 A/69 and from a copending one, both in the name of same applicant, having the formulae:

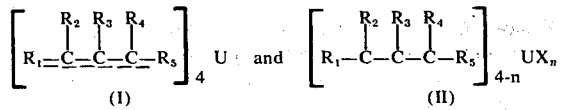

in which $R_1$, $R_2$, $R_3$, $R_4$ and $R_5$, the same or different, may be hydrogen atoms, alkyl radicals having from 1 to 10 carbon atoms, aryl radicals having from 6 to 10 carbon atoms, cycloalkyl radicals having from 4 to 10 carbon atoms, and alkylaryl radicals; the dotted line indicates the possible delocalization of the valence electrons; X is an anion selected from $Cl^-$, $Br^-$ and $I^-$; and $n$ is an integer ranging from 1 to 3.

It has now been found, which is the subject of the present invention, that the above allyl compounds are very active as catalysts in the polymerization of conjugated diolefins giving rise to highly stereospecific and high molecular weight polymers.

The afore mentioned allyl compounds can be employed as such, or mixed with particular co-catalysts of the type of so-called "Lewis acids" such as, for instance, $AlCl_3$, $BCl_3$, $TiCl_4$, $AlR\ Cl_2$, $Al\ R_2\ Cl$, $Al\ R_3$, $BF_3$, $SuCl_4$, $AlCl_2NR_2$, $AlHCl_2$ and some others, in which R is a hydrocarbon radical.

Also the Lewis acids employed as co-catalysts in the inventive process may be used as such or complexed with a compound selected, for instance, from ethers, tertiary amines, phosphines and some others, in such a way that they are represented by the formulae $AlCl_3.O(C_2H_5)_2$, $BF_3. O(C_2H_5)_2$, $AlCl_3.N(CH_3)_3$, $AlRCl_2.O(C_2H_5)_2$ and so on.

According to the invention process diolefin polymers are obtained, which constitute a further subject object of the invention, in which the monomer units enchainment is prevalently 1,4 and particularly 1,4 cis.

When the polymerization is carried out in the presence of catalyst and co-catalyst, use is made of a molar ratio between Lewis acid and uranium compound ranging from 0.01 to 10 and preferably from 0.1 to 1.

The total concentration of the catalyst with respect to the monomer fed to reaction ranges from 0.001 to 1% by moles: very good reaction rates together with high molecular weight of the obtained polymers are generally achieved by employing the catalyst in an amount ranging from 0.01 to 0.5% by moles with respect to the monomer fed to reaction.

The polymerization reaction is always carried out in the homogeneous phase: in fact the uranium allyl derivatives and halogen allyl derivatives, initially insoluble in the reaction medium, become completely soluble, as soon as the monomer is introduced.

The catalyst can be indifferently prepared either in the presence or in the absence of monomer: for instance it can be prepared and aged at room temperature, before the introduction of the monomer.

At the end of the polymerization it can be removed by means of a simple centrifugation.

The inventive reaction can be carried out in the presence of solvents which are inert with respect to the catalyst, generally selected from saturated aliphatic hydrocarbons such as pentane, n-hexane, n-heptane and some others, aromtic hydrocarbons as benzene, toluene, cycloalkyl hydrocarbons or halogen containing hydrocarbons. The polymerization temperature ranges from $-78°C$ to $+100°C$ and all operations must be carried out in the absence of air and moisture, i.e. under an inert gas atmosphere, because the employed catalysts are sensitive to oxygen and protonic agents.

The inventive process make it possible to polymerize monomers belonging to the class of conjugated diolefines, and particularly those selected from butadiene 1,3; isoprene; 2,3-dimethylbutadiene 1,3; 2-phenylbutadiene 1,3; 2,3-diphenylbutadiene 1,3; pentadiene 1,3 (piperylene).

The aforesaid monomers may be used also two at a time in order to obtain butadiene-isoprene or butadiene-pentadiene copolymers in which the monomer units have a prevalent cis 1,4 enchainment.

The polymerization process according to the present invention is quite general, but is particularly efficacious in polymerizing butadiene: in fact it makes it possible to obtain a polymer which is almost completely of the cis 1,4 type, and has characteristics which are superior to those of any other butadiene obtainable with stereospecific catalysts.

The polybutadiene, obtained according to the inventive process, presents, for instance, a semicrystallization time (at $-20°C$) lower than 10', and an ultimate tensile stress ranging between 220 and 250 $kg/cm^2$.

It is known that an elastomer constituted by polymeric chains at high cis 1,4 unit content has very good dynamic properties owing to the high flexibility of the macromolecular chains.

However, it is also known that polybutadiene, even if the cis 1,4 unity content is very high, has not enough workability characteristics: by workability we mean both the behaviour of the elastomer in the mixer during the compounding phase of ingredients, and the behaviour of the mix in the subsequent operations of extrusion, calendering and some others. For this reason the employment of the elastomer, as such, in making several industrial articles, is different and, sometimes, is not convenient from a practical point of view.

The characteristics of the polybutadiene obtained according to the inventive process are superior to those of the usual polybutadienes because of the very good workability combined with improved mechanical properties.

The uranium allyl compounds are also active in the polymerization of olefins, particularly of ethylene.

The polymer obtained shows a very high linearity, is solid and contains a number of methyl groups per monomer unit which is lower than 0.01%.

In the same way it is possible to obtain ethylene diolefin copolymers, particularly ethylene-butadiene and ethylene-isoprene copolymers.

All of the aforementioned characteristics and some other peculiarities of the inventive process and the obtained products will be emphasized by the following examples.

EXAMPLE 1

Use was made of a 200 cm³ capacity drink bottle through which an inert gas was previously passed; therein 80 cm³ of anhydrous toluene were introduced under an inert atmosphere and, after having been cooled to 0°C, 0.3 mmole of ($\pi$-allyl)$_3$ U Cl was introduced.

The bottle was shut with a neoprene plug and a crown metallic plug bored so that a hypodermic needle might be introduced. Now, through a hypodermic needle directly welded to a cylinder containing butadiene, 23 g of monomer were introduced as liquid.

Then the bottle was put in a rotating bath thermostated at the 0°C for 15 hours. At end the bottle was uncorked and the content discharged into 0.5 l of methyl alcohol containing 1% antioxidant.

The coagulated polymer was dried under vacuum at room temperature for one night. The yield in solid polymer was 17.2 g equal to 75% of fed monomer. The infrared analysis carried out on a sample dissolved in carbon disulphide gave the following results: cis 1,4 = 98.4%; trans 1,4 = 1.3%; 1,2 = 0.3%. The intrinsic viscosity of the polymer, measured at 30°C in toluene, was 3.5 dl/g.

EXAMPLE 2

Following the procedure described in example 1, 80 cm³ of toluene, 0.5 mmole of ($\pi$-allyl)$_3$UI and 23 g of butadiene were introduced into the bottle. The yield of solid polymer was 20 g equal to 87% of fed monomer.

Infrared analysis: cis 1,4 = 97.4%; trans 1,4 = 1.9%; 1,2 = 0.7%.

EXAMPLE 3

By working according to example 1 the bottle was fed with 80 cm³ of toluene, 0.24 mmole of U($\pi$-allyl)$_4$ and 0.24 mmole of Br$_2$ in order to prepare "in situ" ($\pi$-allyl)$_3$UBr.

Then 31 g of butadiene were introduced and the polymerization was carried out in a thermostatically controlled bath at 20°C for 25 hours.

The yield in solid polymer was 23 g equal to 74% of fed monomer.

Infrared analysis: cis 1,4 = 98.5%; trans 1,4 = 1%; 1,2 = 0.5%.

EXAMPLES 4 – 5

According to the procedure described in example 1 isoprene was polymerized by employing different ($\pi$-allyl)$_3$ U halides.

The test was performed by using 0.5 mmole of uranium compound and 20 g of isoprene. The polymerization was carried out at 0°C for 24 hours and the results are reported in Table I.

TABLE I

| Example No. | | Yield in solid polymer | | Infrared analysis | | |
|---|---|---|---|---|---|---|
| | | g | % | cis 1,4% | trans 1,4% | 1,2% 3.4 |
| 4 | ($\pi$-allyl)$_3$UCl | 9.1 | 45 | 95 | — | 5 = |
| 5 | ($\pi$-allyl)$_3$U I | 8.5 | 42 | 94.5 | — | 5.5 = |

EXAMPLE 6

Following the procedure of example 1, 20 g of 1,3-pentadiene were polymerized by employing, as catalyst, 0.6 mmole of ($\pi$-allyl)$_3$UCl in 80 cm³ of toluene at 0°C for 24 hour 6.1 g of solid polymer were obtained (30%) which, at infrared analysis, showed an 1,4 unity content equal to 100%, of which 77% were cis 1,4 and 23% were trans 1,4.

EXAMPLES 7 – 9

By working according to example 1, butadiene and isoprene were copolymerized by ($\pi$-allyl)$_3$UCl. All tests were performed by employing 0.5 mmole of uranium compound in 80 cm³ of toluene at 0°C for 18 hours.

The results are reported on Table II.

TABLE II

| Example No. | Butadiene g | Isoprene g | Yield g | % | % of 1,3 butadiene in copolymers |
|---|---|---|---|---|---|
| 7 | 21 | 7 | 20 | 71 | 83 |
| 8 | 15 | 20 | 16 | 46 | 58 |
| 9 | 5 | 25 | 12 | 40 | 24 |

The respective percentages of the monomers in copolymer were determined by NMR spectroscopy.

The following examples show the increase of activity obtained by using a co-catalyst as described in the introduction.

EXAMPLE 10

By working according to example 1, 80 cm³ of toluene, 0.3 mmole of (90-allyl)$_3$ UI and 0.03 mmole of AlI$_3$ were introduced into the bottle. Then 25 g of butadiene were introduced and the polymerization run for 1 hour at 20°C.

The yield in solid polymer was 20.5 g (82%) which, at infrared analysis, gave the following composition. cis 1,4 = 98%; trans 1,4 = 1.5%; 1,2 = 0.5%

EXAMPLES 11 – 15

According to the procedure referred to in example 10, butadiene was polymerized by employing various uranium compounds and co-catalysts.

All tests were performed by using 0.3 mmole of uranium compounds in 80 cm³ of hexane, whilst the co-catalyst amounts were varied according to the used compound.

The polymerizations were carried out for 1 hour at 20°C and the results are reported on Table III.

TABLE III

| Example No. | Catalyst mmoles | Co-catalyst mmoles | Butadiene g | Yield g | Yield % | I. R. Analysis cis 1.4% | trans 1.4% | 1.2% | 30° [η] tol. |
|---|---|---|---|---|---|---|---|---|---|
| 11 | (π-allyl)$_3$U 0.30 | AlCl$_3$.OEt$_2$ 0.15 | 27 | 20 | 74 | 98 | 1 | 1 | 4.50 |
| 12 | (π-allyl)$_3$UCl 0.30 | AlCl$_3$ 0.09 | 25 | 13 | 52 | 99 | 0.8 | 0.2 | 4.31 |
| 13 | (π-allyl)$_3$UCl 0.30 | BCl$_3$ 0.06 | 32 | 31 | 97 | 97.0 | 2.5 | 0.5 | 3.51 |
| 14 | (π-allyl)$_3$UCl 0.30 | Al Et$_3$ 0.12 | 25 | 19 | 76 | 97.0 | 2.5 | 0.5 | 3.85 |
| 15 | (π-allyl)$_3$UCl 0.3 | TiCl$_4$ 0.03 | 21 | 10 | 48 | 98.5 | 1 | 0.5 | 4.05 |

EXAMPLES 16 – 20

These examples show the influence of the co-catalyst/catalyst ratio on the yield of the butadiene polymerization.

The catalyst system was obtained by reacting, according to the procedure of example 10, 0.2 mmole of (π-allyl)$_4$U with various amounts of alkyl-aluminium-chloride in 80 cm$^3$ of hexane. The tests were carried out at 20°C for two hours. The results are reported on Table IV.

TABLE IV

| Example No. | Catalyst mmoles | Co-catalyst mmoles | Butadiene g | Yield g | Yield % | I. R. Analysis cis 1.4% | trans 1.4% | 1.2% | −30 tol. |
|---|---|---|---|---|---|---|---|---|---|
| 16 | (π-allyl)$_4$U 0.20 | AlEtCl$_2$ 0.04 | 29 | 1 | 3 | 98.4 | 1.4 | 0.2 | — |
| 17 | (π-allyl)$_4$U 0.20 | AlEtCl$_2$ 0.08 | 36 | 16 | 45 | 97.4 | 1.6 | 1 | 4.81 |
| 18 | (π-allyl)$_4$U 0.20 | AlEtCl$_2$ 0.10 | 32 | 29 | 91 | 99 | 0.7 | 0.3 | 3.43 |
| 19 | (π-allyl)$_4$U 0.20 | AlEtCl$_2$ 0.12 | 29 | 28 | 95 | 97.4 | 1.8 | 0.8 | 3.31 |
| 20 | (π-allyl)$_4$U 0.20 | AlEtCl$_2$ 0.18 | 28 | 1.3 | 5 | 97.7 | 0.9 | 1.4 | — |

EXAMPLES 21 – 25

In the following tests isoprene was polymerized by employing different uranium compounds and various catalysts. By working according to example 10, 0.20 mmole of uranium compound was always used in 80 cm$^3$ of hexane, whereas the cocatalyst amounts were varied according to the compound used.

The polymerizations were performed for 4 hours at 20°C.

The results are reported in Table V.

TABLE V

| Example No. | Catalyst mmoles | Co-catalyst mmoles | Isoprene g | Yield g | Yield % | I. R. Analysis cis 1.4% | trans 1.4% | 1.2% | 3.4% |
|---|---|---|---|---|---|---|---|---|---|
| 21 | (π-allyl)$_3$U 0.20 | AlCl$_3$.OEt$_2$ 0.06 | 20 | 13 | 65 | 95.5 | 0.8 | — | 3.7 |
| 22 | (π-allyl)$_3$U 0.20 | TiCl$_4$ 0.16 | 20 | 13 | 55 | 96.5 | — | 0.3 | 3.2 |
| 23 | (π-allyl)$_3$UCl 0.20 | TiCl$_4$ 0.06 | 20 | 16 | 80 | 94.5 | — | — | 5.5 |
| 24 | (π-allyl)$_3$UCl 0.20 | AlEtCl$_2$ 0.04 | 20 | 6 | 30 | 94.0 | — | — | 6.0 |
| 25 | (π-allyl)$_4$U 0.20 | BCl$_3$ 0.16 | 20 | 10 | 50 | | | | |

EXAMPLES 26 – 30

These examples show the influence of the co-catalyst/catalyst ratio on the yield of isoprene polymerization. The catalyst system was obtained by reacting, according to example n 0.10, 0.2 mmole of (π-allyl)$_4$U with variable amounts of TiCl$_4$ in 80 cm$^3$ of hexane.

The tests were carried out at 20°C for 45′; the results are reported on Table VI.

TABLE VI

| Example No. | Catalyst mmoles | Co-catalyst mmoles | Isoprene g | Yield g | Yield % | I. R. Analysis cis 1.4% | trans 1.4% | 1.2% | 3.4% |
|---|---|---|---|---|---|---|---|---|---|
| 26 | (π-allyl)$_4$U 0.20 | TiCl$_4$ 0.08 | 20 | 4 | 19 | 94 | — | — | 6 |
| 27 | (π-allyl)$_4$U 0.20 | TiCl$_4$ 0.10 | 20 | 9 | 44 | 94.3 | — | — | 5.7 |
| 28 | (π-allyl)$_4$U 0.20 | TiCl$_4$ 0.12 | 20 | 17 | 83 | 94.5 | — | — | 5.5 |
| 29 | (π-allyl)$_4$U 0.20 | TiCl$_4$ 0.14 | 20 | 17 | 83 | 94 | — | — | 6 |
| 30 | (π-allyl)$_4$U 0.20 | TiCl$_4$ 0.16 | 20 | 14 | 69 | 94 | — | — | 6 |

EXAMPLES 31 – 35

These examples show the influence of the co-catalyst/catalyst ratio on the yield of isoprene polymerization.

The catalyst system was obtained by reacting, according to example 10, 0.2 mmoles of ($\pi$-allyl)$_4$U with variable amounts of alkyl-alluminium-dichloride in 80 cm$^3$ of hexane.

The tests were carried out at 20°C for 15 hours: the results are reported on Table VII.

290 g of butadiene were introduced, under stirring and keeping the temperature inside the reactor at 15°C for the whole reaction time.

The reaction was stopped after 2 hours by adding 10 cc of methyl alcohol, then the polymer solution was transferred into a washing vessel, under an inert atmosphere.

The solution was washed under a strong stirring with three portions of water free from air, each of them consisting of 2 liters; then, after the addition of 0.2 – 0.3% of a phenyl antioxidant, the polymer was recov-

TABLE VII

| Example No. | Catalyst mmoles | Co-catalyst mmoles | Isoprene g | Yield g | Yield % | I. R. Analysis cis 1.4% | trans 1.4% | 1.2% | 3.4% |
|---|---|---|---|---|---|---|---|---|---|
| 31 | ($\pi$-allyl)$_4$U 0.20 | AlEtCl$_2$ 0.08 | 20 | 1.5 | 7 | 92.5 | — | — | 7.5 |
| 32 | ($\pi$-allyl)$_4$U 0.20 | AlEtCl$_2$ 0.12 | 20 | 9 | 45 | 93 | — | — | 7 |
| 33 | ($\pi$-allyl)$_4$U 0.20 | AlEtCl$_2$ 0.16 | 20 | 20 | 100 | 93.5 | — | — | 6.5 |
| 34 | ($\pi$-allyl)$_4$U 0.20 | AlEtCl$_2$ 0.20 | 20 | 3 | 15 | 91 | — | — | 9 |
| 35 | ($\pi$-allyl)$_4$U 0.20 | AlEtCl$_2$ 0.24 | 20 | 1 | 5 | 89.7 | — | 0.3 | 10 |

EXAMPLE 36

By working according to example 10, 0.2 mmole of ($\pi$-allyl)$_3$UI was reacted with 0.06 mmole of AlEtCl$_2$ in 80 cm$^3$ of hexane. Then g 20 of 1,3 pentadiene (75% of trans isomer) were added and the polymerization run at 20°C for 20 hours.

9.1 g of solid polymer were obtained which, at I.R. analysis, showed an 1,4 unity content of 100%, of which 87% are cis 1,4 unity and 13% are trans 1,4 unity.

EXAMPLES 37 – 38

According to example 10 a mixture was copolymerized consisting of 1,3 pentadiene and 1,3 butadiene by ($\pi$-allyl)$_3$UI and AlEtCl$_2$; the polymerization was carried out at 20°C for 20 hours, and the results are reported on Table VIII.

ered by removing the solvent through a steam distillation at room temperature.

The polymer crumbs were dried under vacuum at 50°C up to constant weight.

250 g of polymer were obtained, equal to a 86% yield, which, at I.R. analysis, showed the following structure: cis 1,4 = 98.5%; trans 1,4 = 0.5%; 1,2 = 1%.

The polymer was completely free from gel: in fact the filtration of a toluene polymer solution at 5% concentration by weight through a kieselghur filtering candle having a hole average $\phi$ of 8 $\mu$ left no gelled residue.

The physical properties of the polymer were the following:

intrinsic viscosity 4.9 dl/g
Mooney viscosity 65
mix Mooney viscosity 98

TABLE VIII

| Example No. | Catalyst | Co-catalyst | Butadiene | Pentadiene 1.3 | Solid Polymer | % C$_5$ in Polymer | I.R. Analysis | |
|---|---|---|---|---|---|---|---|---|
| 37 | ($\pi$-allyl)$_3$ U I 0.20 | AlEtCl$_2$ 0.06 | 25 | 5 | 25 | 5 | Total content cis 1.4 trans 1.4 1.2 | 96 3 1 |
| 38 | ($\pi$-allyl)$_3$U I 0.20 | AlEtCl$_2$ 0.06 | 30 | 10 | 29 | 10 | Total content cis 1.4 trans 1.4 1.2 | 95 4 1 |

EXAMPLE 39

3 liters of anhydrous n-hexane, 2.23 mmoles of AlC$_2$H$_5$Cl$_2$ and 7.43 mmoles of ($\pi$-C$_3$H$_5$)$_3$UCl were introduced into a 5 l capacity autoclave, euqipped with a stirrer of the anchor type and a cooling jacket. Then $$\frac{M_w}{M_n} = 6.2$$

($M_w$ = weighted average molecular weight
$M_n$ = arithmetical average molecular weight)

semicrystallization time (at −20°C, in minutes) = 5'
The technological properties were the following ones:

| | | | | | | |
|---|---|---|---|---|---|---|
| workability of polymer (4-4-4) | | | | | | |
| workability of mix (4-4-4) | | | | | | |
| vulcanization at 145°C for | 25' | 30' | 45' | 60' | 90' | 120' |
| modulus at 300% Kg/cm$^2$ (ASTM D 412) | 53 | 57 | 86 | 98 | 105 | 103 |
| ultimate tensile stress kg/cm$^2$ (ASTM D 412) | 168 | 193 | 225 | 230 | 217 | 209 |

Continued

| | | | | | | |
|---|---|---|---|---|---|---|
| elongation at break % (ASTM D 412) | 600 | 590 | 540 | 500 | 480 | 460 |
| tearing charge Kg/cm (ASTM D 624) | 80 | 105 | 60 | 40 | 40 | — |
| Δ T°C (ASTM D 623 method A) | — | — | 28 | 24 | 22 | — |
| abrasion mm³ (DIN 53516 (1 Kg) | — | — | 25 | 22 | 20 | — |

The vulcanization recipe was the following:

| | |
|---|---|
| Polymer | 100.0 |
| NBS ST. HAF Black | 50.0 |
| NBS St. ZnO | 3.0 |
| NBS St. S | 1.75 |
| NBS St. Stearic Acid | 2.0 |
| Flexamine | 1.0 |
| Resin 731 D | 5.0 |
| Aromatic Oil | 5.0 |
| Nobs No. 1 | 0.9 |
| NBS = National Bureau of Standard | |

The properties of polybutadiene obtained according to the process of the present invention differentiate from those of common polybutadienes as follows:

1. Steric purity

Exceptionally high as we can argue from the cis 1,4 enchainment content by means of infrared spectroscopy (method referred to by D. Morero, Chim. Ind. 41, 758 (1959), but, above all, from the crystallization rate (measured by the dilatometer method, as described by Bakkedahl N., J. Res. Natl. Bur. Std., 13, 411 (1934).

The data are reported on Table IX.

TABLE IX

| | cis 1.4 % | Semicrystallization time at −20°C (by minutes) |
|---|---|---|
| Polybut. at Li (Diene 55 Firestone) | 40 | does not crystallize |
| Polybut. at Ti (Europrene cis) | 95 | >3.000 |
| Polybut. at Co (Cariflex BR 1220) | 97 | 35 |
| Polybut. at Ni (JSR BR O₁) | 97–98 | 23 |
| Polybut. at U | ≥ 98 | 5 |

2. Workability

Exceptionally high both for the polymer as such and the mixes with carbon black.

The valuation relative to various polybutadienes is reported on Table X. The valuation criterium is the one hereinafter reported.

TABLE X

| | Valuation of workability Polymer | Mix |
|---|---|---|
| Polybut. at Li | 0 (0-0-0) | 3 (1-1-1) |
| Polybut. at Ti | 1 (1-0-0) | 4 (1-0-3) |
| Polybut. at Co | 5 (1-3-1) | 8 (3-2-3) |
| Polybut. at Ni | 7 (3-3-1) | 10 (3-4-3) |
| Polybut. at U | 12 (4-4-4) | 12 (4-4-4) |

From the Table X one may infer the polybutadiene according to the present invention is the only one which allows to be worked and transformed without being mixed with other elastomers (f.i. SBR, NR, IR) contrarily to the usual polybutadienes.

3. Mechanical properties

By taking, as comparison term, the ultimate tensile stress of the vulcanized products obtained from a standard mixture, in Table XI the differences are emphasized, very favourable to the inventive polybutadiene.

TABLE XI

| Mechanical properties | Ultimate tensile stress (kg/cm²) |
|---|---|
| Polybut. at Li | 160 |
| Polybut. at Ti | 180 |
| Polybut. at Co | 190 |
| Polybut. at Ni | 190 |
| Polybut. at U | 230 |
| (Method ASTM D 412, hollow punch D) | |

Workability:

Internal method for the valuation of the behaviour on the 150 × 300 mixing rolls of mixes and elastomers.

Description and setting-up of apparatus:

Use is made of 150 × 300 mixing roll. The velocity of rolls, which we worked at, was the following one:

Rub pitch: for roll (near to worker) 26 rounds/1'; hinger roll 34 rounds/1'. The distance between sliders, measured in contact with the rolls, was kept at mm 170.

The distance between the rolls was fixed at mm 1.10, calculated on an elastomer or mix volume of 200 cm³.

The material, which was being worked, had to be on the roll having the lower velocity; when the mix or the polymer tended to pass on the other roll, the valuation was also performed even if bringing the wording "on the fast roll". If the temperature was not specified, a temperature of 50°C ± 5°C was recommended.

Test for elastomers

The distance between the rolls was maintained at mm 1.10. The elastomer was wrapped on the rolls; if it did not stay on rolls, it was helped by hand so as to maintain the replacement and the temperature and the elastomer always was under strain.

The workability valuation was performed, when it was not otherwise specified, after mixing for 5' with the moving rolls and was obtained by summing up three observations.

The valuation time was calculated from the instant that the elastomer may be rolled up.

Working temperature 60°C ± 5°C.

The variable quantities, with the respective observations were the following ones:

| Tackiness | Observations |
|---|---|
| all wound | 4 |
| partially wound | 3 |
| partial fall | 1 |
| completely detached | 0 |
| Indentations and holes (*) (sizes) | Observations |

-continued

| | |
|---|---|
| no one | 4 |
| < 10 mm | 3 |
| 10 + 30 mm | 2 |
| > 30 mm | 1 |

| Indentations and holes (*) (number) | Observations |
|---|---|
| no one | 4 |
| < 5 | 3 |
| 5 + 10 | 1 |
| > 10 | 0 |

The valuation ranged from 1 to 12. An elastomer could be thought workable when having the value of 9.

(*) We considered the ones visible to the worker during the test. The polymerization was carried out at 30°C and, after the scheduled time, the autoclave was ventilated, methyl alcohol was added, and the solid polymer was discharged into a glass washed with methyl alcohol and hydrochloric acid, then was dried in oven at 40°C. The conditions and the results are reported in Tab. 1 A whereas the properties of the obtained polymer are reported in Table 1 B.

Tests for the mixes

The distance between the rolls was kept at mm 1.10.
Firstly 5 runs of the mix were performed at a distance of mm 0.4, then the mix was wound.
Also now, if the mix did not adhere to the rolls, it was helped by hand.
The valuation was performed at 5' of mixing with the moving rolls. The variable quantities, with the respective observations, were the following ones.

| Surface | Observations |
|---|---|
| Smooth and bright | 4 |
| Smooth | 3 |
| rough | 1 |
| very rough | 0 |

| Tackiness | |
|---|---|
| all wound | 4 |

-continued

| | |
|---|---|
| partially wound | 3 |
| partial fall | 1 |
| completely detached | 0 |
| Indentations (*) | |
| no one | 4 |
| few (<10) and small (<10 mm) | 3 |
| few (<10) big, or many (10 + 30) and small (<10 mm) | 1 |
| very numerous | 0 |

The valuation ranged from 0 to 12. A mix could be thought workable when having the value of 10.

(*) We considered the ones visible to the worker during the test. The polymerization was carried out at 30°C and, after the scheduled time, the autoclave was ventilated, methyl alcohol was added, and the solid polymer was discharged into a glass washed with methyl alcohol and hydrochloric acid, then was dried in oven at 40°C. The conditions and the results are reported in Tab. 1 A whereas the properties of the obtained polymer are reported in Table 1 B.

EXAMPLE 40

By working according to the procedure of example 1 and with quite pure reagents, 100 cm$^3$ of n-hexane, 0.0072 mmole of ($\pi$-allyl)$_4$U and 0.0058 mmole of AlEtCl$_2$ were introduced into the reactor. Then 27 g of butadiene were introduced and polymerized at 24°C for 30 minutes.
The yield in solid polymer was 12 g (44.4%) which, at infrared analysis gave the following composition:
1,4 cis = 98%; 1,4 trans = 1%; 1,2 = 1%.

EXAMPLES 41 – 47

The polymerization of ethylene is described by means of uranium $\pi$-tetraallyl or uranium $\pi$-allylhalides without or with Lewis acids.
The operation was carried out in a 1000 cm$^3$ autoclave equipped with a cooling or heating jacket, and stirrer of the magnetic trailing type with anchor. Solvent, catalyst and monomer were subsequently introduced under an inert gas atmosphere.

TABLE 1A

| Example No. | Hexane g | Uranium compound moles × 10$^{-3}$ | Lewis acid moles × 10$^{-3}$ | Ethylene g | T °C | Duration h | Solid Polymer g |
|---|---|---|---|---|---|---|---|
| 41 | 250 | U(C$_3$H$_5$)$_3$Cl 0.4 | — | 25 | 30 | 2 | 20 |
| 42 | 250 | U(C$_3$H$_5$)$_4$ 0.4 | — | 31 | 30 | 3 | 10 |
| 43 | 250 | U(C$_3$H$_5$)$_2$Cl$_2$ 0.3 | — | 30 | 30 | 2 | 23 |
| 44 | 250 | U(C$_3$H$_5$)$_3$Cl 0.4 | AlEtCl$_2$ 0.24 | 29 | 30 | 1 | 23 |
| 45 | 250 | U(C$_3$H$_5$)$_3$Cl 0.3 | Al(Et)Cl$_2$ 0.12 | 27 | 30 | 0.5 | 27 |
| 46 | 250 | U(C$_3$H$_5$)$_4$ 0.4 | AlEtCl$_2$ 0.16 | 30 | 30 | 1 | 21 |
| 47 | 250 | U(C$_3$H$_5$)$_4$ 0.4 | TiCl$_4$ 0.16 | 33 | 30 | 1 | 33 |

TABLE 1B

| Example No. | [$\eta$]$^{135}$ dec dl/g | D | Melting point °C | Cristallinity at X-rays % | Methyl group number % |
|---|---|---|---|---|---|
| 41 | 18.0 | 0.9390 | 136.5 | 91.5 | <0.01 |
| 42 | 20.3 | 0.9338 | 134.0 | 77.0 | <0.01 |
| 43 | 14.6 | 0.9445 | 137.0 | 83.0 | <0.01 |
| 44 | 18.5 | 0.9377 | 136.0 | 90.0 | <0.01 |
| 45 | 16.5 | 0.9431 | 136.0 | 85.0 | <0.01 |
| 46 | 17.3 | 0.9419 | 136.0 | 82.5 | <0.01 |
| 47 | 19.1 | 0.9352 | 134.5 | 77.0 | <0.01 |

EXAMPLES 48 – 51

We show the copolymerization of ethylene with conjugated diolefins as 1-3 butadiene and isoprene by means of catalysts consisting of tetraallyl-uranium or of π-allyl-uranium halides with Lewis acids.

The working procedure is the same as in example 1A, and the conditions and results are reported in Table II A.

TABLE IIA

| Example No. | Hexane g | Uranium compound moles × 10⁻³ | Lewis acid mole × 10⁻³ | Monomers diolefin g | ethylene g | T °C | Duration h | Yield in Solid Polymer g | % diolefin in polymer | % 1-4 unity of diolefin in polymer |
|---|---|---|---|---|---|---|---|---|---|---|
| 48 | 250 | U(C₃H₅)₃Cl 0.4 | Ti Cl₄ 0.24 | butadiene 7 | 35 | 30 | 0.5 | 33 | 8 | 90 |
| 49 | 250 | U(C₃H₅)₃Cl 0.4 | Ti Cl₄ 0.24 | isoprene 6 | 50 | 30 | 0.5 | 43 | 6 | 90 |
| 50 | 250 | U(C₃H₅)₄ 0.4 | Ti Cl₄ 0.24 | butadiene 11 | 27 | 30 | 0.5 | 35 | 20 | 90 |
| 51 | 250 | U(C₃H₅) Cl 0.4 | Al Et Cl₂ 0.16 | butadiene 19 | 35 | 30 | 0.15 | 38 | 24 | 90 |

What we claim is:

1. Process for the stereospecific homopolymerization of a diolefin wherein the homopolymerization reaction is carried out in the presence of a catalyst selected from the uranium allyl derivatives having the formula and

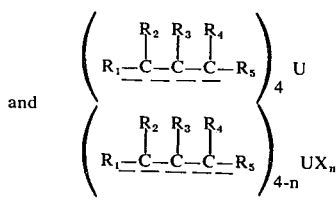

wherein $R_1$, $R_2$, $R_3$, $R_4$ and $R_5$, the same or different, are selected from the group consisting of hydrogen atoms, alkyl radicals containing from 1 to 10 carbon atoms, aryl radicals containing from 6 to 10 carbon atoms, cycloalkyl radicals containing from 4 to 10 carbon atoms and alkylaryl radicals; X is an anion selected from Cl⁻, Br⁻ and I⁻; $n$ is a number ranging between 1 and 3; and the dotted line indicates the possible delocalization of the valence electrons.

2. Process for the stereospecific homopolymerization of a diolefin according to claim 1, wherein the homopolymerization reaction is carried out in the presence of a co-catalyst selected from Lewis acids.

3. Process for the stereospecific homopolymerization of a diolefin according to claim 2, wherein the co-catalyst employed is a Lewis acid complexed with a compound selected from ethers, tertiary amines and phosphines.

4. Process for the stereospecific homopolymerization of a diolefin according to claim 2, wherein the homopolymerization reaction is carried out in the presence of co-catalyst and catalyst at a molar ratio ranging from 0.01 to 10.

5. Process for the stereospecific homopolymerization of a diolefin according to claim 1, wherein the amount of employed catalyst ranges from 0.001 to 1% by moles with respect to the moles of the monomer fed to reaction.

6. Process for the stereospecific homopolymerization of a diolefin according to claim 1, wherein the homopolymerization reaction is carried out in the presence of a solvent selected from aliphatic saturated hydrocarbons, aromatic, cycloalkyl hydrocarbons and halogenated hydrocarbons.

7. Process for the stereospecific homopolymerization of a diolefin according to claim 1, wherein the homopolymerization reaction is carried out at a temperature in the range between −78°C and +100°C.

8. Process for the stereospecific homopolymerization of a diolefin according to claim 1, wherein the diolefin is selected from butadiene (1,3), isoprene, 2-3 dimethylbutadiene (1,3), 2-phenylbutadiene (1,3), 2-3 diphenylbutadiene (1,3), pentadiene (1,3).

9. Process for the stereospecific homopolymerization of a diolefin according to claim 1, wherein the diolefin employed is butadiene 1,3.

10. Process for the stereospecific homopolymerization of a diolefin according to claim 8, wherein the diolefin employed is isoprene.

11. Process for the stereospecific homopolymerization of a diolefin according to claim 8, wherein the diolefin employed is pentadiene 1,3.

12. Process for the polymerization and copolymerization of olefins wherein the polymerization reaction is carried out in the presence of a catalyst selected from the uranium allyl derivatives having the formula and

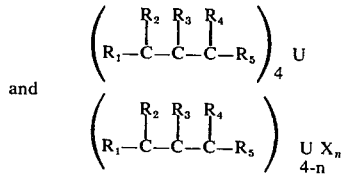

wherein $R_1$, $R_2$, $R_3$, $R_4$ and $R_5$, the same or different, are selected from members of the group consisting of hydrogen atoms, alkyl radicals containing from 1 to 10 carbon atoms, aryl radicals containing from 6 to 10 carbon atoms, cycloalkyl radicals containing from 4 to 10 carbon atoms, and alkyl aryl radicals; X is an anion selected from Cl⁻, Br⁻ and I⁻; $n$ is a number ranging between 1 and 3; and the dotted line indicates the possible delocalization of the valence electrons.

13. Process according to claim 12, wherein the polymerization reaction is carried out in the presence of a co-catalyst selected from Lewis acids.

14. Process according to claim 13 wherein the co-catalyst employed is a Lewis acid complexed with a compound selected from ethers, tertiary amines and phosphines.

15. Process according to claim 13, wherein the polymerization reaction is carried out in the presence of the co-catalyst and catalyst at a molar ratio ranging from 0.01 to 10.

16. Process according to claim 12, wherein the catalyst amount employed ranges from 0.001 to 1% by moles with respect to the moles of the monomer fed to reaction.

17. Process according to claim 12, wherein the polymerization reaction is carried out in the presence of a solvent selected from aliphatic saturated hydrocarbons, aromatic, cycloalkyl hydrocarbons and halogenated hydrocarbons.

18. Process according to claim 12, wherein the polymerization reaction is carried out at a temperature in the range between −50°C and +150°C.

19. Process for the copolymerization of olefins according to claim 12 wherein a contemporaneous use is made of butadiene 1,3 and isoprene.

20. Process for the copolymerization of olefins according to claim 12 wherein a contemporaneous use is made of pentadiene 1,3 and butadiene 1,3.

* * * * *

UNITED STATES PATENT AND TRADEMARK OFFICE
CERTIFICATE OF CORRECTION

PATENT NO. : 3,937,692
DATED : February 10, 1976
INVENTOR(S) : Gabriele Lugli, Alessandro Mazzei and Gabriele Modini It is certified that error appears in the above-identified patent and that said Letters Patent are hereby corrected as shown below:

In the Abstract, correct formula to read -

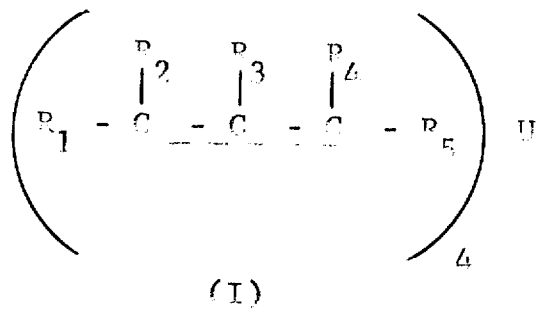

(I)

and

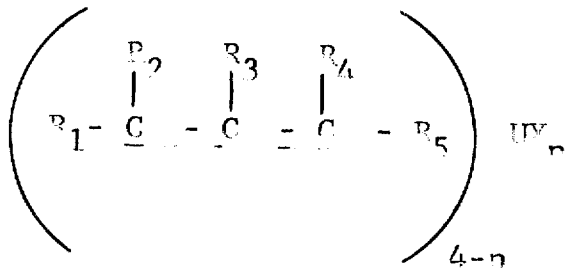

(II)

UNITED STATES PATENT AND TRADEMARK OFFICE
CERTIFICATE OF CORRECTION

PATENT NO. : 3,937,692
DATED : February 10, 1976
INVENTOR(S) : Gabriele Lugli, Alessandro Mazzei and Gabriele Modini It is certified that error appears in the above-identified patent and that said Letters Patent are hereby corrected as shown below:

Column 1, correct formula "(II)" to read -

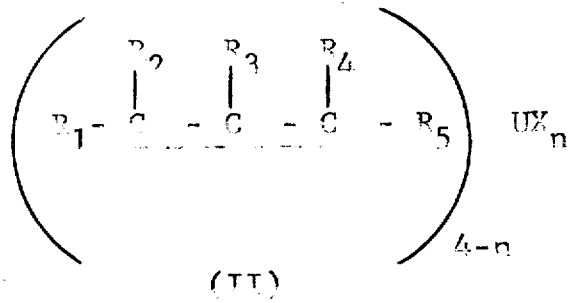

(II)

Column 2, line 9, correct the spelling of "aromatic" and after "hydrocarbons" insert --such--.

line 16, correct "make" to read --makes--.

Column 4, line 19, change "hour" to read --hours--.

line 51, correct "(90-allyl)$_3$" to read --($\pi$-allyl)$_3$--.

Column 6, line 36, "n 0." should read --no.--.

Column 7, line 60, correct spelling of "equipped".

UNITED STATES PATENT AND TRADEMARK OFFICE
CERTIFICATE OF CORRECTION

PATENT NO. : 3,937,692
DATED : February 10, 1976
INVENTOR(S) : Gabriele Lugli, Alessandro Mazzei and Gabriele Modini It is certified that error appears in the above-identified patent and that said Letters Patent are hereby corrected as shown below:

Column 8, line 34, correct spelling of "kieselguhr".

Column 9, line 26, "41" should read --41--.

line 29, "13" should read --13--.

Column 10, line 27, correct "binger" to read --binder--.

Column 13, line 52, correct spelling of "complexed".

Columns 13 and 14, Table IIA, correct the figures, in each instance, under the last column to read "$\leq 90$".

UNITED STATES PATENT AND TRADEMARK OFFICE
CERTIFICATE OF CORRECTION

PATENT NO. : 3,937,692
DATED : February 10, 1976
INVENTOR(S) : Gabriele Lugli, Alessandro Mazzei and Gabriele Modini It is certified that error appears in the above-identified patent and that said Letters Patent are hereby corrected as shown below:

Column 14, lines 41-45, correct the formulae to read -

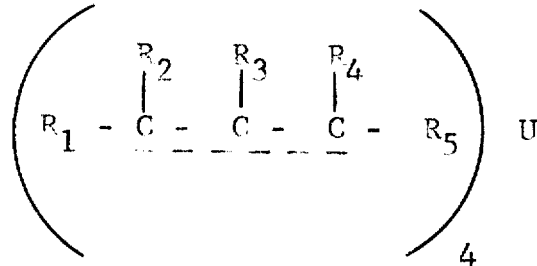

and

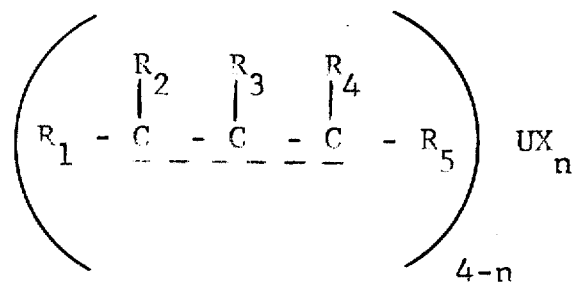

Column 14, line 49, delete "selected from".

Signed and Sealed this
first Day of June 1976

[SEAL]

Attest:

RUTH C. MASON
Attesting Officer

C. MARSHALL DANN
Commissioner of Patents and Trademarks